Figure 1:
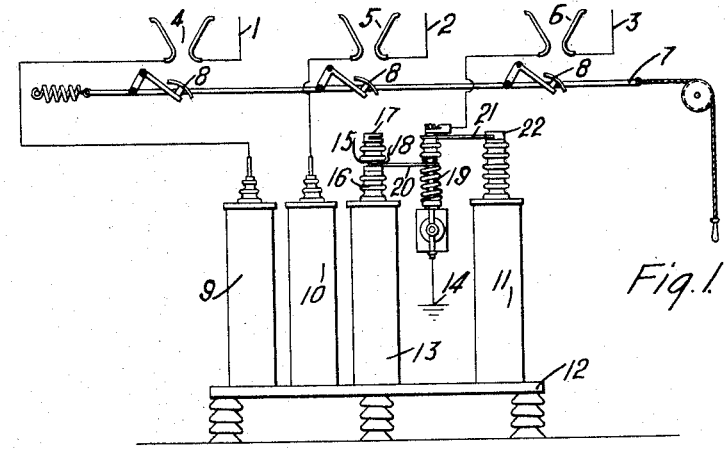

R. P. JACKSON.
ELECTROLYTIC LIGHTNING ARRESTER.
APPLICATION FILED JULY 24, 1914.

1,177,335.

Patented Mar. 28, 1916.

WITNESSES:
Fred. A. Lind.
Geo. W. Hansen.

INVENTOR
Ray P. Jackson
BY
Wesley G. Carr
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTROLYTIC LIGHTNING-ARRESTER.

1,177,335. Specification of Letters Patent. Patented Mar. 28, 1916.

Application filed July 24, 1914. Serial No. 852,794.

*To all whom it may concern:*

Be it known that I, RAY P. JACKSON, a citizen of the United States, and a resident of Edgewood Park, in the county of Allegheny and State of Pennsylvania, have invented a new and useful Improvement in Electrolytic Lightning-Arresters, of which the following is a specification.

My invention relates to protective devices for electrical systems, and more particularly to electrolytic lightning arresters which are connected between the conductors of the system to be protected and ground.

Electrolytic lightning arresters are generally connected to each conductor of a transmission system through spark-gaps which are adapted to break down at voltages slightly above the normal operating voltage of the conductors. When an abnormal potential disturbance occurs upon a conductor, it discharges across the spark gap and passes through the electrolytic lightning arrester to ground. Inasmuch as electrolytic cells require intermittent charging to maintain the films upon the aluminum electrodes effective, and, since the cells are normally disconnected, through the spark gaps, from the conductors with which they are associated, it is necessary to bridge frequently the spark-gaps in order that current may flow through the cells to reform the insulating films on the electrodes.

In affording protection to a transmission system comprising two or more conductors, it is usual to connect one terminal of a cell to each conductor, and to connect the other terminal of all the cells to a common or neutral point which, in turn, is connected to ground through an additional cell, frequently characterized as the ground cell. In the usual three-phase transmission system comprising three conductors, four electrolytic cells are used, three of which are directly connected to three conductors of the system, and the fourth of which is connected between the neutral or common point of the aforementioned three cells and ground. With this arrangement, which is generally known as the "multiplex" system, it is easy to apply the normal potential of the system to the cells which may be directly connected to the conductors, but it is impossible to send sufficient current through the ground cell to maintain the insulating films formed on its electrodes in good condition.

The object of my invention, therefore, is to provide a novel arrangement for subjecting the ground cell to the normal potential of the line in order that the insulating films on the electrodes of all the cells comprising the "multiplex" connection may be kept in good condition.

My invention will best be understood in connection with the following description and the accompanying drawing in which—

Figure 2:
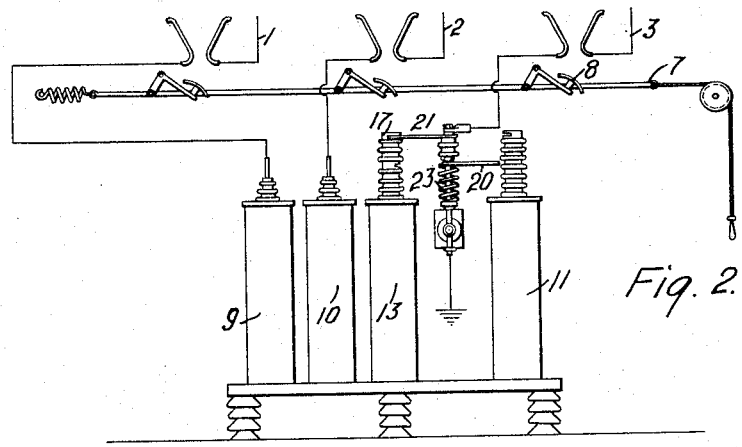
Figure 3:
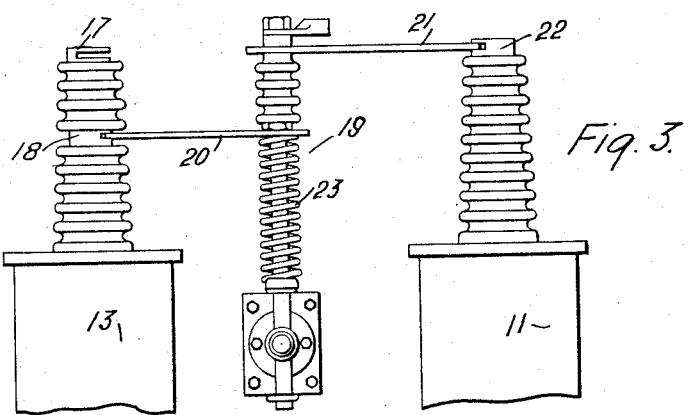

Figure 1 is a diagrammatic view showing my invention as applied to a group of lightning arresters connected to a three-phase transmission system; Fig. 2 is a diagrammatic view of the same showing electrical connections so interchanged that the ground cell is connected directly to one of the conductors for charging purposes, and Fig. 3 is an enlarged view, in elevation, of the switching mechanism by means of which the electrical connections are controlled.

Referring to Figs. 1 and 2, three conductors 1, 2 and 3 of a three-phase transmission system are connected through horn-gap members 4, 5 and 6, respectively, to electrolytic cells which protect the conductors against abnormal potential disturbances. It is apparent that the cells are normally disconnected from the conductors and, therefore, it is essential to bridge the horn-gap members in order to perform the charging operation. By actuating the mechanism 7, bridging members 8 are advanced upwardly, thereby connecting electrolytic cells 9, 10 and 11 directly to the conductors 1, 2 and 3, respectively. The cells 9, 10 and 11 are connected in any suitable manner—but preferably through a conducting base 12, which is the usual method,—to a common or neutral point which constitutes the base 12. A ground cell 13 is connected between the neutral point 12 and a ground connection 14 by means of a switching device, as shown in the drawing and to be hereinafter described.

As shown in Fig. 1, the cell 13 is disposed in the ground leg of the multiplex connection, and, consequently, sufficient current does not pass through it to reform the films upon the aluminum electrodes comprising the cell. Therefore, provision must be made for momentarily connecting the cell 13 to one of the transmission line conductors in order that a momentary flow of current may traverse the cell. To this end, the cell 13 is provided with a terminal 15 which is embraced by a sectional insulating bushing 16. The bushing 16 is of such a construction that two superposed contact members or clips 17 and 18 are provided which are separated from each other by means of the upper section of the bushing 16. A rotatable transfer switch 19, having one blade 20 connected to ground and another blade 21 connected to the line conductor 3, is interposed between the cells 11 and 13 and adapted to engage the terminals of said cells. The blades 20 and 21 of the switch 19 are disposed, one above the other, in such manner that the blade 21 may engage either the terminal 22 of the cell 11 or the terminal 17 of the cell 13. Blade 20 of the transfer switch is substantially shorter than the blade 21 and therefore engages only the contact clip 18 of the terminal 15.

When it is desired to connect the ground cell 13 to the line conductor 3, the transfer switch 19 is rotated into the position shown in Fig. 2. The blade 21 that is directly connected to the conductor 3, engages the upper clip 17 of the outlet terminal of the cell 13, while the grounded blade 20 is disconnected entirely from the electrical circuit. A tensional element 23 is so arranged that, when the operator's hand is released from the transfer switch 19, the blades 20 and 21 will return to their normal position, as shown in Fig. 1. It is evident that, when the blade 19 is in the position shown in Fig. 2, the cell 11 is disconnected from the circuit, and the cells 9, 10 and 13 are connected in Y to the conductors of the three-phase transmission system.

In Fig. 3, I have shown an enlarged view of my transfer switch and associated terminals of the cells 11 and 13. It will be seen that, inasmuch as the blade 21 is substantially longer than the blade 20, the cell 11 is farther removed from the switch 19 than the cell 13. This permits the blade 20 to be rotated without engaging the terminal of the cell 11.

While I have shown the transfer switch 19 of a specific construction, it will be apparent that my system is not limited to the specific structure of the switch.

Although I have shown and described somewhat in detail an embodiment of my invention, it will be understood that I desire only such limitations to be imposed as are indicated in the appended claims.

I claim as my invention:

1. The combination with an electrical conductor, and two electrolytic cells normally connected in series relationship between the conductor and ground, of a transfer switch having a pair of pole members which, in one position, connect the cell that is normally connected to ground to said conductor, and disconnect from circuit the cell that is normally connected to the line conductor from circuit, and means for automatically returning the switch to reëstablish normal circuit connections for said cells.

2. The combination with an electrical conductor, and two electrolytic cells normally connected in series relationship between the conductor and ground, of a transfer switch provided with rotatable blades disposed intermediate the terminals of said cells whereby one of them may be disconnected from circuit and the other may be connected to the conductor.

3. The combination with two electrolytic cells normally connected in series relationship, one of said cells having a terminal provided with two superposed contact clips, of a multi-pole transfer switch having two superposed blades which may engage either of said contact clips at will.

4. The combination with two electrolytic cells normally connected in series relationship, one of said cells having a terminal provided with two superposed contact clips, of a transfer switch having a blade connected to ground and a blade connected to a line conductor, said blades being superposed on each other and rotatably mounted to engage said contact clips at will.

5. The combination with an electrical conductor and two lightning arresters having two of their terminals permanently connected to each other, one of said arresters having two contact members attached to one of its terminals, of a multi-pole transfer switch having one pole connected to said electrical conductor and another pole grounded, said switch in one position connecting one of said contact members to ground, and in another position connecting the other of said contact members to the electrical conductor.

6. The combination with an electrical conductor and two electrolytic condensers having two of their terminals permanently connected to each other, of a transfer switch having a pair of blades which, in one position, connects said condensers in series relationship between the conductor and ground, and in another position connects the grounded cell directly to said electrical conductor and simultaneously disconnects the other cell from circuit.

7. The combination with a pair of line conductors, two electrolytic cells normally connected thereto and to a neutral point, and another electrolytic cell normally connected between said neutral point and ground, of a transfer switch comprising a pair of blades which, in one position, engages said ground cell to connect it to ground and engages one of said line cells to connect it to one of said line conductors, and in another position engages the ground cell to connect it to one of said line conductors and disconnects the aforementioned line cell from circuit.

In testimony whereof, I have hereunto subscribed my name this 9th day of July, 1914.

RAY P. JACKSON.

Witnesses:
O. W. A. OETTING,
B. B. HINES.

Copies of this patent may be obtained for five cents each, by addressing the "Commissioner of Patents, Washington, D. C."